(12) United States Patent
Meng et al.

(10) Patent No.: US 10,935,084 B2
(45) Date of Patent: Mar. 2, 2021

(54) HYDRO-VISCOUS SPEED REGULATING DEVICE FOR HEAVY-LOAD START OF BELT CONVEYOR

(71) Applicants: CHINA UNIVERSITY OF MINING AND TECHNOLOGY, Jiangsu (CN); XUZHOU ZHIRUN MINING EQUIPMENT SCIENCE AND TECHNOLOGY CO., LTD., Jiangsu (CN)

(72) Inventors: Qingrui Meng, Jiangsu (CN); Fan Jiang, Jiangsu (CN); Zuzhi Tian, Jiangsu (CN); Chenghao Zhao, Jiangsu (CN); Xin Zhang, Jiangsu (CN)

(73) Assignees: CHINA UNIVERSITY OF MINING AND TECHNOLOGY, Jiangsu (CN); XUZHOU ZHIRUN MINING EQUIPMENT SCIENCE AND TECHNOLOGY CO., LTD., Jiangsu (CN)

( * ) Notice: Subject to any disclaimer, the term of this patent is extended or adjusted under 35 U.S.C. 154(b) by 0 days.

(21) Appl. No.: 16/095,242

(22) PCT Filed: Dec. 12, 2017

(86) PCT No.: PCT/CN2017/115553
§ 371 (c)(1),
(2) Date: Oct. 19, 2018

(87) PCT Pub. No.: WO2018/196393
PCT Pub. Date: Nov. 1, 2018

(65) Prior Publication Data
US 2020/0400202 A1 Dec. 24, 2020

(30) Foreign Application Priority Data
Apr. 27, 2017 (CN) .......................... 201710285520.5

(51) Int. Cl.
| | |
|---|---|
| *F16D 25/10* | (2006.01) |
| *F16D 25/12* | (2006.01) |
| *F16D 43/284* | (2006.01) |
| *F16D 43/30* | (2006.01) |

(52) U.S. Cl.
CPC ........... *F16D 25/10* (2013.01); *F16D 25/123* (2013.01); *F16D 43/284* (2013.01); *F16D 43/30* (2013.01)

(58) Field of Classification Search
CPC ................... F16D 25/10; F16D 25/123; F16D 2021/0653; F16D 13/52; F16D 13/74; F16D 2500/50287; F16D 43/284; F16D 43/30
See application file for complete search history.

(56) References Cited

U.S. PATENT DOCUMENTS

| | | | | |
|---|---|---|---|---|
| 4,238,020 A | * | 12/1980 | Nerstad | F16D 43/284 137/542 |
| 4,361,217 A | * | 11/1982 | Bieber | B60W 30/18 192/103 FA |
| 4,399,900 A | * | 8/1983 | Ballendux | F16D 25/14 192/106 F |

FOREIGN PATENT DOCUMENTS

| | | |
|---|---|---|
| CN | 102032289 A | 4/2011 |
| CN | 104455070 A | 3/2015 |

(Continued)

*Primary Examiner* — Mark A Manley
(74) *Attorney, Agent, or Firm* — Seed IP Law Group LLP

(57) ABSTRACT

A hydro-viscous speed regulating device for heavy-load start of a belt conveyor is provided. An input shaft and an output shaft are connected through a spline tube, an inner friction plate set, and an outer friction plate set. The inner and outer friction plate sets are controlled by an inner oil cylinder and an outer oil cylinder respectively. Oil inlet and oil return of the inner oil cylinder and the outer oil cylinder are controlled by an oil inlet valve core and an oil return valve core automatically. During starting process, pressure oil enters (Continued)

into the outer oil cylinder, and pushes the outer friction plate set to be engaged to provide torque required by the output shaft. After the starting process is completed, the revolving speed of the output shaft rises; the oil inlet valve core and the oil return valve core move outward under the effect of a centrifugal force; the pressure oil enters into the inner oil cylinder and pushes the inner friction plate set to be engaged to provide torque required by the output shaft, and at the same time, oil returns to the outer oil cylinder. That is, during starting process, the outer friction plate set provides large torque required for start, and the inner friction plate set provides small torque during normal operation. The present invention achieves automatic switching between different torque required for start and normal operation. Moreover, the present invention has a compact structure, reliable performance, and low costs, and is applicable in a wide range.

4 Claims, 1 Drawing Sheet

(56) References Cited

FOREIGN PATENT DOCUMENTS

| | | |
|---|---|---|
| CN | 204213323 U | 3/2015 |
| CN | 105605123 A | 5/2016 |
| CN | 106594107 A | 4/2017 |
| CN | 107061541 A | 8/2017 |
| GB | 2498202 A | 7/2013 |

* cited by examiner

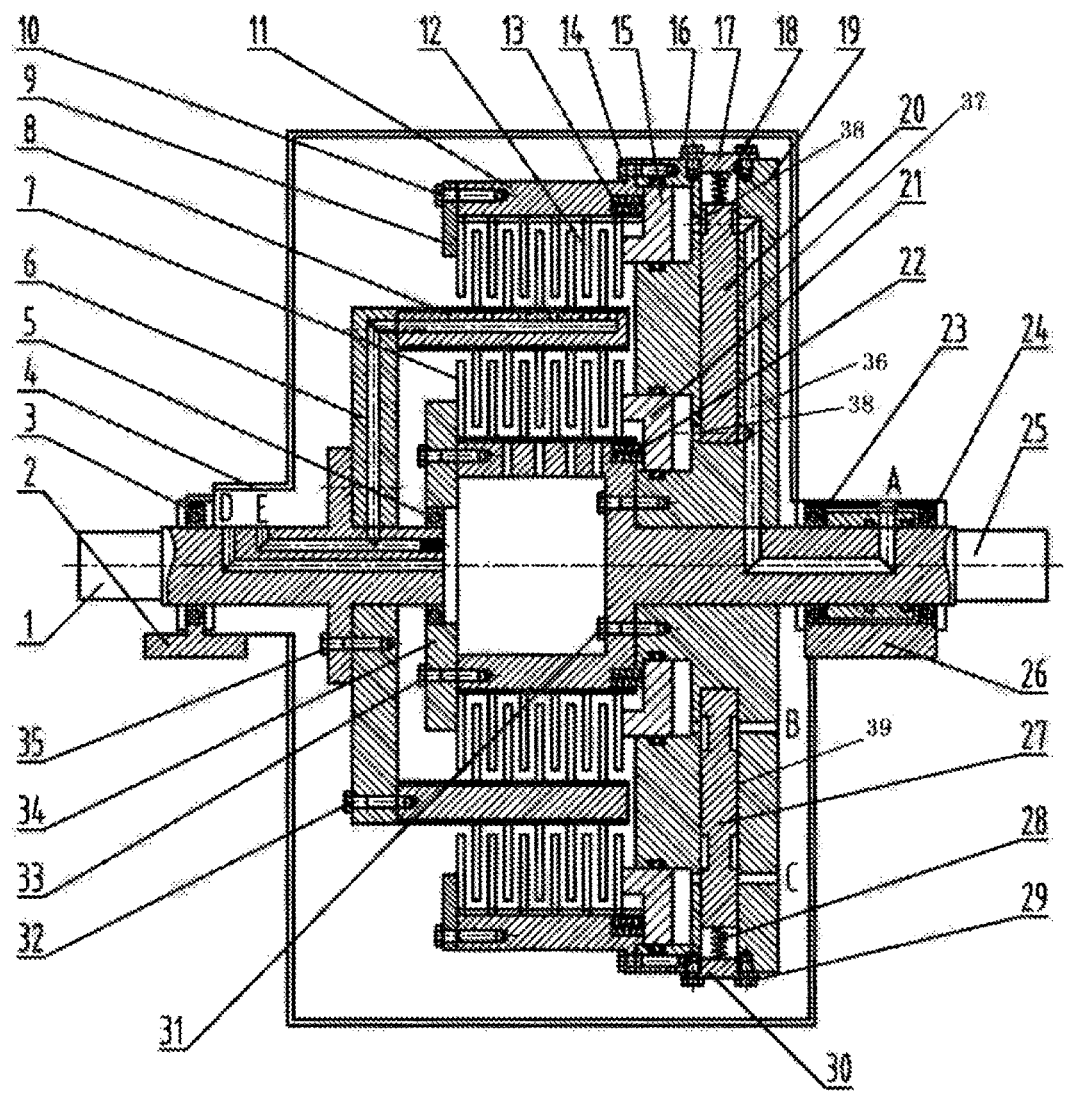

HYDRO-VISCOUS SPEED REGULATING DEVICE FOR HEAVY-LOAD START OF BELT CONVEYOR

BACKGROUND

Technical Field

The present disclosure relates to the technical field of starting process control of a belt conveyor, and in particular, to a hydro-viscous speed regulating device for heavy-load start of a belt conveyor.

Description of the Related Art

A hydro-viscous variable speed clutch is used for starting process control of a belt conveyor. It can control the belt conveyor to complete a starting process according to a given speed curve, reduce a dynamic stress borne by the belt conveyor in the starting process, and extend a service life of the belt conveyor. Meanwhile, the hydro-viscous variable speed clutch can regulate the speed in an operation process, thereby saving energy and reducing consumption. Generally, starting torque of the hydro-viscous variable speed clutch is selected based on rated load of the belt conveyor. However, as the belt conveyor is often started in an overload working condition, the selected hydro-viscous variable speed clutch often fails to meet the requirement. If a hydro-viscous variable speed clutch with large torque is directly selected, there is no problem in the starting process, but in a normal operation process, it is difficult to implement speed regulation by adjusting the torque of the variable speed clutch.

BRIEF SUMMARY

Embodiments of the present invention provide a hydro-viscous speed regulating device. The hydro-viscous speed regulating device can provide large starting torque in a full-load working condition or even an overload working condition to achieve reliable and smooth start, and can provide suitable small torque during smooth operation, thus facilitating speed control. Meanwhile, the hydro-viscous speed regulating device has a compact structure, operates smoothly, requires low costs, and is convenient to maintain.

In one embodiment, a hydro-viscous speed regulating device for heavy-load start of a belt conveyor includes an input shaft, an inner friction plate set, an outer friction plate set, an inner piston, an outer piston, an oil inlet valve core, an oil return valve core, and an output shaft.

An input shaft end disc is fixedly connected with a circular boss at the middle of the input shaft through a bolt VIII, and is fixedly connected with an input shaft spline tube through a bolt VI. Inner splines of the input shaft spline tube form a flexible connection with an outer friction plate in the inner friction plate set through splines, and outer splines of the input shaft spline tube form a flexible connection with an inner friction plate in the outer friction plate set through splines. An inner friction plate in the inner friction plate set forms a flexible connection with outer splines of a large-diameter barrel at the left end of the output shaft through splines, and an outer friction plate in the outer friction plate set forms a flexible connection with inner splines of an output shaft spline tube through splines. An outer baffle is fixedly connected with a left end face of the output shaft spline tube through a bolt I. An output shaft end disc is fixedly connected with a barrel at the left end of the output shaft through a volt VII. The output shaft spline tube is fixedly connected with an output shaft control board through a bolt II. A left end face of the output shaft control board is provided with an outer annular groove in a region near an outer cylindrical surface and an inner annular groove in a region near an inner hole. The outer piston and the inner piston are mounted in the outer annular groove and the inner annular groove respectively. A right end face of the output shaft spline tube is provided with a round hole. An outer piston spring is mounted in the round hole, and a right end face of the outer piston spring acts on an end face of the outer piston. A right end face of the large-diameter barrel at the left end of the output shaft is provided with a round hole near an outer cylindrical surface. The inner piston spring is mounted in the round hole, and a right end face of the inner piston spring acts on an end face of the inner piston. The output shaft control board is fixedly connected with the large-diameter barrel at the left end of the output shaft through a bolt V.

An inner cylindrical surface of the output shaft control board is provided with a radial oil hole, the outer cylindrical surface of the output shaft control board is provided with a radial hole I at a position parallel to the radial oil hole, and the oil inlet valve core is mounted in the radial hole I. The inner and outer annular grooves of the output shaft control board are each provided with a lateral oil hole, so that the radial oil hole traverses the radial hole I to be in communication with the two annular grooves. An oil inlet valve core spring is mounted at the top of the oil inlet valve core, and a spring bearer plate I is fixedly connected with the output shaft control board through a volt III to press the oil inlet valve core spring at the top of the oil inlet valve core. A diameter of the top of the oil inlet valve core is less than a diameter of the radial hole I, so that the radial oil hole is in communication with the outer annular groove of the output shaft control board. The bottom of the oil inlet valve core seals up the lateral oil hole through which the radial oil hole is communicated with the inner annular groove of the output shaft control board.

The output shaft control board is provided with a radial hole II, which is of the same size as the radial hole I, at a position axially symmetric to the radial hole I about the output shaft, and the oil return valve core is mounted in the radial hole II. An oil return valve core spring is mounted at the top of the oil return valve core, and a spring bearer plate II is fixedly connected with the output shaft control board through a bolt IV to press the oil return valve core spring at the top of the oil return valve core. The output shaft control board is provided with an oil return hole B of an inner oil cylinder and an oil return hole C of an outer oil cylinder. The oil return hole B of the inner oil cylinder and the oil return hole C of the outer oil cylinder traverse the inner and outer annular grooves as well as the radial hole II. The oil return valve core is provided with an upper annular groove and a lower annular groove. The lower annular groove of the oil return valve core enables the inner annular groove of the output shaft control board to be communicated with an outer side of the output shaft control board through the oil return hole B of the inner oil cylinder. The upper annular groove of the oil return valve core is slightly lower than the oil return hole C of the outer oil cylinder, and a cylinder at an upper end of the upper annular groove of the oil return valve core prevents the outer annular groove of the output shaft control board from being communicated with the outer side of the output shaft control board through the oil return hole C of the outer oil cylinder.

Further, the output shaft is supported by a bearing III and a bearing IV. The bearing III and the bearing IV are mounted in a right bearing block. The output shaft is provided with a pressure oil inlet hole A that is in communication with the radial oil hole of the output shaft control board. The input shaft is provided with a lubricating oil inlet hole D of the inner friction plate set and a lubricating oil inlet hole E of the outer friction plate set.

Further, the hydro-viscous speed regulating device further includes a housing. The housing is mounted between a left bearing block and a right bearing block. The inner friction plate set, the outer friction plate set and so on are all mounted in the housing.

Further, the input shaft is supported by a bearing I and a bearing II. The bearing I is mounted in a left bearing block, and the bearing II is mounted in an inner hole of the output shaft end disc.

Embodiments of the present invention have advantages over prior systems, including: 1. The hydro-viscous speed regulating device of an embodiment of the present invention is provided with an inner friction plate set and an outer friction plate set. When equipment is started, the outer friction plate set works and can provide large torque to enable the equipment to overcome a static friction force and complete the starting process. The equipment requires small torque during normal operation, the outer friction plate set is separated, and the inner friction plate set starts to work. The inner friction plate set provides small torque and is responsive to torque adjustment, thus facilitating speed regulation of the equipment.

2. The oil inlet valve core and the oil return valve core move outward under the effect of a centrifugal force as the revolving speed rises, so that pressure oil in the outer oil cylinder leaks out, and at the same time, pressure oil enters into the inner oil cylinder, thus implementing automatic operation switching between the outer friction plate set and the inner friction plate set.

3. The hydro-viscous speed regulating device of an embodiment of the present invention has a compact structure, reliable performance, and low costs, and is applicable in a wide range.

BRIEF DESCRIPTION OF THE DRAWING

FIG. 1 is a structural diagram of an embodiment of the present invention.

Meanings of reference labels in the drawing: 1—input shaft, 2—left bearing block, 3—bearing I, 4—housing, 5—bearing II, 6—input shaft end disc, 7—inner friction plate set, 8—input shaft spline tube, 9—outer baffle, 10—bolt I, 11—output shaft spline tube, 12—outer friction plate set, 13—outer piston spring, 14—bolt n, 15—outer piston, 16—bolt III, 17—spring bearer plate I, 18—oil inlet valve core spring, 19—output shaft control board, 20—oil inlet valve core, 21—inner piston, 22—inner piston spring, 23—bearing III, 24—bearing IV, 25—output shaft, 26—right bearing block, 27—oil return valve core, 28—oil return valve core spring, 29—bolt IV, 30—spring bearer plate II, 31—bolt V, 32—bolt VI, 33—bolt VII, 34—output shaft end disc, 35—bolt VIII, 36—radial oil hole, 37—radial hole I, 38—lateral oil hole, 39—radial hole II, A—pressure oil inlet hole, B—oil return hole of the inner oil cylinder, C—oil return hole of the outer oil cylinder, D—lubricating oil inlet hole of the inner friction plate set, E—lubricating oil inlet hole of the outer friction plate set.

DETAILED DESCRIPTION

As shown in FIG. 1, a hydro-viscous speed regulating device of an embodiment of the present invention includes an input shaft 1, an inner friction plate set 7, an outer friction plate set 12, an inner piston 21, an outer piston 15, an oil inlet valve core 20, an oil return valve core 27, an output shaft 25 and so on.

The input shaft 1 is supported by a bearing I 3 and a bearing II 5. The bearing I 3 is mounted in a left bearing block 2, and the bearing II 5 is mounted in an inner hole of an output shaft end disc 34. An input shaft end disc 6 is fixedly connected with a circular boss at the middle of the input shaft 1 through a bolt VIII 35, and is fixedly connected with an input shaft spline tube 8 through a bolt VI 32.

Inner splines of the input shaft spline tube 8 form a flexible connection with an outer friction plate in the inner friction plate set 7 through splines, and outer splines of the input shaft spline tube 8 form a flexible connection with an inner friction plate in the outer friction plate set 12 through splines. An inner friction plate in the inner friction plate set 7 forms a flexible connection with outer splines of a large-diameter barrel at the left end of the output shaft 25 through splines, and an outer friction plate in the outer friction plate set 12 forms a flexible connection with inner splines of an output shaft spline tube 11 through splines. An outer baffle 9 is fixedly connected with a left end face of the output shaft spline tube 11 through a bolt I 10. An output shaft end disc 34 is fixedly connected with a barrel at the left end of the output shaft 25 through a bolt VII 33. The output shaft spline tube 11 is fixedly connected with an output shaft control board 19 through a bolt II 14.

A left end face of the output shaft control board 19 is provided with an annular groove in a region near an outer cylindrical surface and an annular groove in a region near an inner hole. The outer piston 15 and the inner piston 21 are mounted in the two annular grooves respectively. A right end face of the output shaft spline tube 11 is provided with a round hole, an outer piston spring 13 is mounted in the round hole, and a right end face of the outer piston spring 13 acts on an end face of the outer piston 15. A right end face of the large-diameter barrel at the left end of the output shaft 25 is provided with a round hole near an outer cylindrical surface, the inner piston spring 22 is mounted in the round hole, and a right end face of the inner piston spring 22 acts on an end face of the inner piston 21. The output shaft control board 19 is fixedly connected with the large-diameter barrel at the left end of the output shaft 25 through a bolt V 31.

An inner cylindrical surface of the output shaft control board 19 is provided with a radial oil hole 36. The outer cylindrical surface of the output shaft control board 19 is provided with a radial hole I 37 at a position parallel to the radial oil hole. The two annular grooves of the output shaft control board 19 are each provided with a lateral oil hole 38, so that the radial oil hole 36 traverses the radial hole I 37 to be in communication with the two annular grooves. The oil inlet valve core 20 is mounted in the radial hole I 37. An oil inlet valve core spring 18 is mounted at the top of the oil inlet valve core 20, and a spring bearer plate 117 is fixedly connected with the output shaft control board 19 through a bolt III 16 to press the oil inlet valve core spring 18 at the top of the oil inlet valve core 20. A diameter of the top of the oil inlet valve core 20 is relatively small, so that the radial oil hole 36 is in communication with the annular groove near the outer cylindrical surface of the output shaft control board 19. The bottom of the oil inlet valve core 20 seals up the lateral oil hole 38 through which the radial oil hole 36 is communicated with the annular groove near the inner hole of the output shaft control board 19.

The output shaft control board 19 is provided with a radial hole II 39, which is of the same size as the radial oil hole, at a position near the radial oil hole and axially symmetric to the radial oil hole. The oil return valve core 27 is mounted in the radial hole II 39. An oil return valve core spring 28 is mounted at the top of the oil return valve core 27, and a spring bearer plate II 30 is fixedly connected with the output shaft control board 19 through a bolt IV 29 to press the oil return valve core spring 28 at the top of the oil return valve core 27. The output shaft control board 19 is provided with an oil return hole B of an inner oil cylinder and an oil return hole C of an outer oil cylinder that traverse the radial hole through the two annular grooves of the output shaft control board 19. The oil return valve core 27 is provided with two annular grooves near the top and the bottom respectively. The annular groove at the bottom of the oil return valve core 27 enables the inner annular groove of the output shaft control board 19 to be communicated with an outer side of the output shaft control board 19 through the oil return hole B of the inner oil cylinder. The annular groove at the top of the oil return valve core 27 is slightly lower than the oil return hole C of the outer oil cylinder. A cylinder at an upper end of the annular groove at the top of the oil return valve core 27 prevents the outer annular groove of the output shaft control board 19 from being communicated with the outer side of the output shaft control board 19 through the oil return hole C of the outer oil cylinder.

The output shaft 25 is supported by a bearing III 23 and a bearing IV 24. The bearing III 23 and the bearing IV 24 are mounted in a right bearing block 26. The output shaft 25 is provided with a pressure oil inlet hole A that is in communication with the radial oil hole of the output shaft control board 19. The input shaft 1 is provided with a lubricating oil inlet hole D of the inner friction plate set and a lubricating oil inlet hole E of the outer friction plate set. A housing 4 is mounted between the left bearing block 2 and the right bearing block 26. The inner friction plate set 7, the outer friction plate set 12 and so on are all mounted in the housing 4.

During starting process, the input shaft 1 is driven by an external motor to rotate. Pressure oil enters into the pressure oil inlet hole A. Lubricating oil enters into the lubricating oil inlet hole D of the inner friction plate set and the lubricating oil inlet hole E of the outer friction plate set. Under the effect of the oil inlet valve core spring 18, the oil inlet valve core 20 enables the pressure oil that enters into the pressure oil inlet hole A to enter into the outer oil cylinder and act on the outer piston 15. The outer piston 15 pushes the outer friction plate set 12 to start to engage, so that the output shaft 25 starts to output starting torque. The magnitude of the starting torque is controlled by adjusting the pressure of the pressure oil entering into the pressure oil inlet hole A. At this time, the oil return valve core 27 cuts off an oil return path of the outer oil cylinder under the effect of the oil return valve core spring 28.

When the starting process is finished, the revolving speed of the output shaft rises to a rated revolving speed. Under the effect of a centrifugal force, the oil inlet valve core 20 presses the oil inlet valve core spring 18 to move outward, thereby cutting off an oil inlet path of the outer oil cylinder. An oil inlet path of the inner oil cylinder is opened. The pressure oil enters into the inner oil cylinder and pushes the inner piston 21 to press towards the inner friction plate set 7. The inner friction plate set 7 starts to engage and provides torque required by the output shaft 25. Meanwhile, under the effect of the centrifugal force, the oil return valve core 27 presses the oil return valve core spring 28 to move outward, thereby opening the oil return path of the outer oil cylinder and cutting off the oil return path of the inner oil cylinder. That is, the inner friction plate set 7 provides the torque during normal operation.

The outer friction plate set 12 has a large diameter and therefore can provide large torque required for start, so as to overcome a static friction force to complete the starting process. The inner friction plate set 7 has a small diameter and can provide torque required for normal operation, thus facilitating speed regulation during operation.

The hydro-viscous speed regulating device of an embodiment of the present invention can automatically switch engagement states of the outer friction plate set 12 and the inner friction plate set 7 according to an operation speed of the output shaft 25 and provide required torque, thus meeting the requirement of heavy-load start working conditions, such as full-load start and overload start. Moreover, the hydro-viscous speed regulating device of an embodiment of the present invention has a compact structure, reliable performance, and low costs, and is applicable in a wide range.

Described above are merely preferred implementations of the present invention. It should be noted that a person of ordinary skill in the art can further make several improvements and modifications without departing from the spirit of the present invention. These improvements and modifications should also be regarded as the protection scope of the present invention.

In general, in the following claims, the terms used should not be construed to limit the claims to the specific embodiments disclosed in the specification and the claims, but should be construed to include all possible embodiments along with the full scope of equivalents to which such claims are entitled.

What is claimed is:

1. A hydro-viscous speed regulating device for heavy-load start of a belt conveyor, comprising:
    an input shaft;
    an inner friction plate set;
    an outer friction plate set;
    an inner piston;
    an outer piston;
    an oil inlet valve core;
    an oil return valve core; and
    an output shaft;
    wherein an input shaft end disc is fixedly connected with a circular boss at a middle of the input shaft, and is fixedly connected with an input shaft spline tube;
    wherein inner splines of the input shaft spline tube form a flexible connection with an outer friction plate in the inner friction plate set through splines, and outer splines of the input shaft spline tube form a flexible connection with an inner friction plate in the outer friction plate set through splines;
    wherein an inner friction plate in the inner friction plate set forms a flexible connection with outer splines of a large-diameter barrel at an end of the output shaft through splines, and an outer friction plate in the outer friction plate set forms a flexible connection with inner splines of an output shaft spline tube through splines;
    wherein an outer baffle is fixedly connected with a first end face of the output shaft spline tube;
    wherein an output shaft end disc is fixedly connected with a barrel at the end of the output shaft;
    wherein the output shaft spline tube is fixedly connected with an output shaft control board;
    wherein an end face of the output shaft control board is provided with an outer annular groove in a region near an outer cylindrical surface of the outer shaft control board and an inner annular groove in a region near an inner hole, and the outer piston and the inner piston are mounted in the outer annular groove and the inner annular groove respectively;

wherein a second end face of the output shaft spline tube opposite to the first end face of the output shaft spline tube is provided with a first round hole, an outer piston spring is mounted in the first round hole, and an end face of the outer piston spring acts on an end face of the outer piston;

wherein an end face of the large-diameter barrel at the end of the output shaft is provided with a second round hole near an outer cylindrical surface of the large-diameter barrel, an inner piston spring is mounted in the second round hole, and an end face of the inner piston spring acts on an end face of the inner piston;

wherein the output shaft control board is fixedly connected with the large-diameter barrel at the end of the output shaft;

wherein an inner cylindrical surface of the output shaft control board is provided with a radial oil hole, the outer cylindrical surface of the output shaft control board is provided with a first radial hole at a position parallel to the radial oil hole, and the oil inlet valve core is mounted in the first radial hole;

wherein the inner and outer annular grooves of the output shaft control board are each provided with a lateral oil hole, so that the radial oil hole traverses the first radial hole to be in communication with the inner and outer annular grooves;

wherein an oil inlet valve core spring is mounted at a top of the oil inlet valve core, and a first spring bearer plate is fixedly connected with the output shaft control board to press the oil inlet valve core spring at the top of the oil inlet valve core;

wherein a diameter of the top of the oil inlet valve core is less than a diameter of the first radial hole, so that the radial oil hole is in communication with the outer annular groove of the output shaft control board;

wherein the bottom of the oil inlet valve core seals up the lateral oil hole through which the radial oil hole is communicated with the inner annular groove of the output shaft control board;

wherein the output shaft control board is provided with a second radial hole, which is of the same size as the first radial hole, at a position axially symmetric to the first radial hole about the output shaft, and the oil return valve core is mounted in the second radial hole;

wherein an oil return valve core spring is mounted at the top of the oil return valve core, and a second spring bearer plate is fixedly connected with the output shaft control board to press the oil return valve core spring at the top of the oil return valve core;

wherein the output shaft control board is provided with a first oil return hole of an inner oil cylinder and a second oil return hole of an outer oil cylinder, the first oil return hole of the inner oil cylinder and the second oil return hole of the outer oil cylinder traverse the inner and outer annular grooves as well as the second radial hole;

wherein the oil return valve core is provided with an upper annular groove and a lower annular groove;

wherein the lower annular groove of the oil return valve core enables the inner annular groove of the output shaft control board to be communicated with an outer side of the output shaft control board through the first oil return hole of the inner oil cylinder; and wherein the upper annular groove of the oil return valve core is slightly lower than the second oil return hole of the outer oil cylinder, and a cylinder at an upper end of the upper annular groove of the oil return valve core prevents the outer annular groove of the output shaft control board from being communicated with the outer side of the output shaft control board through the second oil return hole of the outer oil cylinder.

2. The hydro-viscous speed regulating device for heavy-load start according to claim 1 wherein:
the output shaft is supported by a first bearing and a second bearing;
the first bearing and the second bearing are mounted in a bearing block;
the output shaft is provided with a pressure oil inlet hole that is in communication with the radial oil hole of the output shaft control board; and
the input shaft is provided with a lubricating oil inlet hole of the inner friction plate set and a lubricating oil inlet hole-s of the outer friction plate set.

3. The hydro-viscous speed regulating device for heavy-load start according to claim 1 wherein:
the hydro-viscous speed regulating device further comprises a housing;
the housing is mounted between a first bearing block and a second bearing block; and
the inner friction plate set and components thereof, and the outer friction plate set and components thereof are mounted in the housing.

4. The hydro-viscous speed regulating device for heavy-load start according to claim 1 wherein the input shaft is supported by a first bearing and a second bearing, the first bearing is mounted in a bearing block, and the second bearing is mounted in an inner hole of the output shaft end disc.

\* \* \* \* \*